(12) United States Patent
Chang

(10) Patent No.: US 8,015,421 B2  
(45) Date of Patent: Sep. 6, 2011

(54) POWER SAVING APPARATUS AND METHOD FOR A PORTABLE APPLIANCE

(75) Inventor: Yao-Tsung Chang, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 11/987,118

(22) Filed: Nov. 27, 2007

(65) Prior Publication Data
US 2010/0320845 A1  Dec. 23, 2010

(30) Foreign Application Priority Data
Sep. 5, 2007  (TW) .............................. 96133094 A

(51) Int. Cl.
G06F 1/32  (2006.01)
(52) U.S. Cl. .................. 713/320; 713/300; 713/324
(58) Field of Classification Search ............... 713/300, 713/310, 320, 322, 323, 324
See application file for complete search history.

(56) References Cited

U.S. PATENT DOCUMENTS

| 7,124,312 B2 * | 10/2006 | Casebolt et al. | 713/323 |
| 7,406,612 B2 * | 7/2008 | O'Connor et al. | 713/320 |
| 7,533,278 B2 * | 5/2009 | Maeshima et al. | 713/300 |
| 2004/0252613 A1 * | 12/2004 | Iwakiri | 369/53.12 |

FOREIGN PATENT DOCUMENTS

| CN | 2059804 U | 8/1990 |
| CN | 1707399 A | 12/2005 |
| JP | 200142978 A | 2/2001 |
| TW | 200613962 | 5/2006 |
| TW | 200630784 | 9/2006 |

* cited by examiner

*Primary Examiner* — Dennis M Butler

(57) ABSTRACT

A power saving apparatus for a portable appliance includes a sensor unit and a control unit. When the portable appliance is raised up, the sensor unit presents a first sensor mode, and then the control unit outputs a first control signal to command the portable appliance to enter into power saving mode which prevents the damages of electronic elements and of the data caused by the vibration from the raise of the portable appliance.

19 Claims, 4 Drawing Sheets

POWER SAVING APPARATUS AND METHOD FOR A PORTABLE APPLIANCE

BACKGROUND OF THE INVENTION

1. Field of the Invention

The present invention relates to a power saving apparatus in an electrical product, more particular to a power saving apparatus and method for a portable appliance.

2. Description of Related Art

With the fast-growing advance technology in the information and computer industry, there are a variety of portable appliances such as the computer, TV, and projector which all have a common feature of convenience to carry.

TW Patent no. M241931 discloses a warning device within a heater. The warning device has an alarm unit disposed between the heater and the power input end of the heater. The alarm unit includes an alarm reminding plate having one end as input end connecting to the power supply, and the other end as output end connecting to the input end of the heater. And also a switch parallelly connects to the alarm reminding plate. When the heater is not inclined, the power directly inputs to the interior of the heater through the switch; when the heater is inclined, the switch is activated to enable the power directly connect to the alarm reminding plate so as to the alarm reminding plate will make the alarm to warn the user.

TW Patent no. M296451 discloses a storage device with protection system having an accelerated sensor unit for sensing the accelerated speed of the storage device to generate the sensor result, and a control unit for controlling the reading and writing element of the storage device for returning to the initial position according to the sensed result.

SUMMARY OF THE INVENTION

It is therefore a primary purpose of the present invention relating to power saving apparatus and method for a portable appliance to provide a power saving apparatus and method for a portable appliance to automatically enter into power saving mode when the portable appliance is raised up.

Another purpose of the claimed invention is to provide a power saving apparatus and method for a portable appliance to prevent the damage of electronic elements and the damage of saved data caused by the vibration from moving the portable appliance.

The present invention relating to a power saving apparatus installed in a portable appliance comprises a sensor unit and a control unit. The sensor unit presents a first sensor mode when the sensor unit senses that the portable appliance is raised up from a shield element, and presents a second sensor mode when the sensor unit senses that the portable appliance is disposed on the shield element. The control unit electrically connecting to the sensor unit for detecting the sensor modes presented by the sensor unit, and then outputting a control signal corresponding to the respective sensor mode; wherein when the sensor unit presents the first sensor mode, the control unit outputs a first control signal to command the portable appliance to perform a power saving mode; when the sensor unit presents the second sensor mode, the control unit outputs a second control signal to command the portable appliance to perform a normal mode.

Further, the present invention relating to a power saving method for a portable appliance having a power saving apparatus with sensing function and controlling function comprises the steps: sensing whether the portable appliance is raised up from or disposed on the shield element; controlling the portable appliance to perform the normal mode when the portable appliance is disposed on the shield element, and to perform the power saving mode when the portable appliance is raised up from the shield element.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention can be more fully understood by reference to the following description and accompanying drawings, in which.

DETAILED DESCRIPTION OF THE INVENTION

Figure 1:
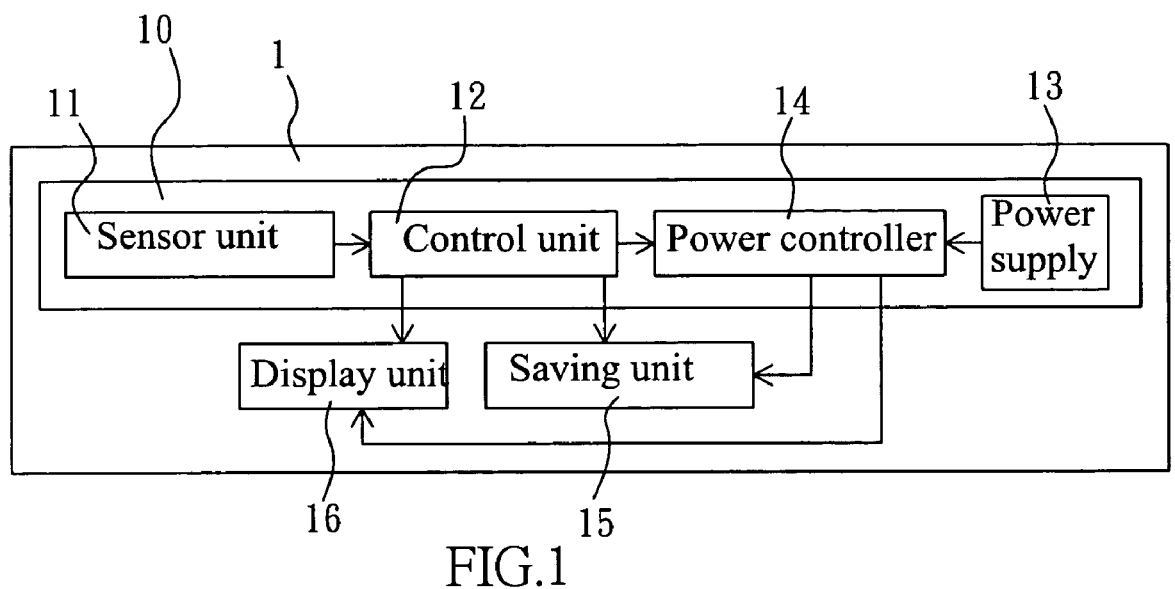
FIG. 1 is the demonstration of functional block of the power saving apparatus in accordance with the present invention.

Referring to FIG. 1, which is the demonstration of functional block of the power saving apparatus in accordance with the present invention. The power saving apparatus 10 includes a sensor unit 11, a control unit 12, a power supply 13, and a power controller 14. The power saving apparatus 10 is installed in a portable appliance 1; the power supply 13 could also be the power source for providing power to internal electrical elements of the portable appliance 1. The sensor unit 11 is used to sense whether the portable appliance is raised up from a shield element. When the portable appliance 1 is raised up, the first sensor mode is presented. When the portable appliance 1 is disposed on the shield element, the second sensor mode is presented. The control unit 12 is used to continuously detect the presented sensor mode sensed by the sensor unit 11.

When the sensor unit 11 presents the first sensor mode, the control unit 12 outputs a first control signal corresponding to the first sensor mode to command the portable appliance 1 to perform a power saving mode. For example, in order to prevent the damage of saving unit 15 and the data saved in the saving unit 15 due to vibration resulting from moving the portable appliance 1, a reading head of a hard drive in the saving unit 15 is set in a parking mode, and then the power controller 14 terminates the power output to the saving unit 15. Or, the saving unit 15 and display unit 16 are set to perform the power saving mode. In addition to terminating the power output to the saving unit 15 and the display unit 16 by the power controller 14, and the power source required by other electrical elements is turned off as well for saving power.

When the sensor unit 11 presents a second sensor mode, the control unit 12 outputs a corresponding second control signal to command the portable appliance 1 to enter into normal mode such that the saving unit 15 and the display unit 16 are commanded to enter into normal mode, or the power controller 14 outputs power supply to the saving unit 15 and the display unit 16 for maintaining normal operation.

Figure 2:
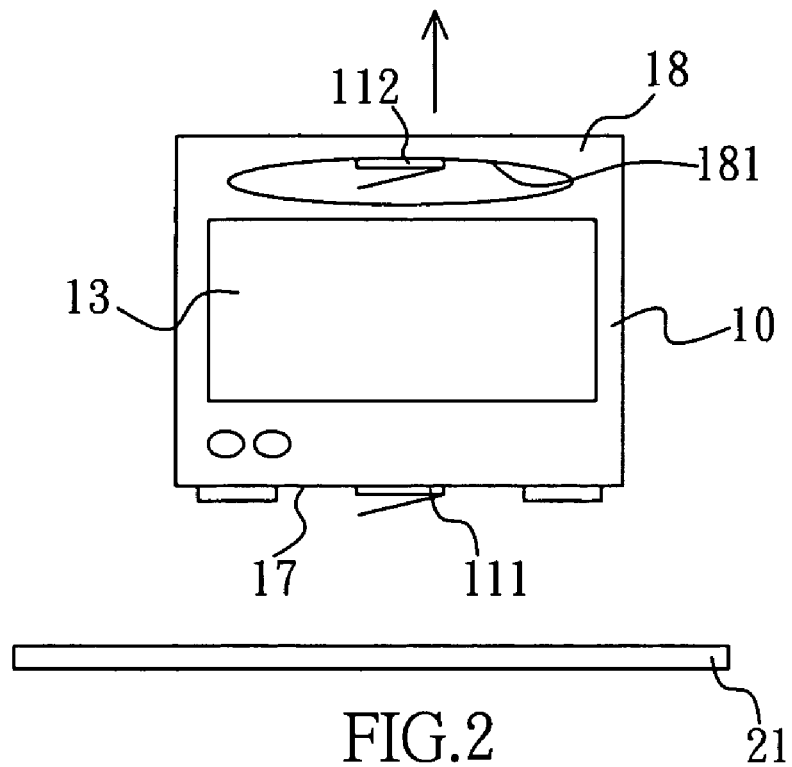
FIG. 2 is the demonstration of the first sensor mode of the first embodiment for the sensor unit in accordance with the present invention.
Figure 3:
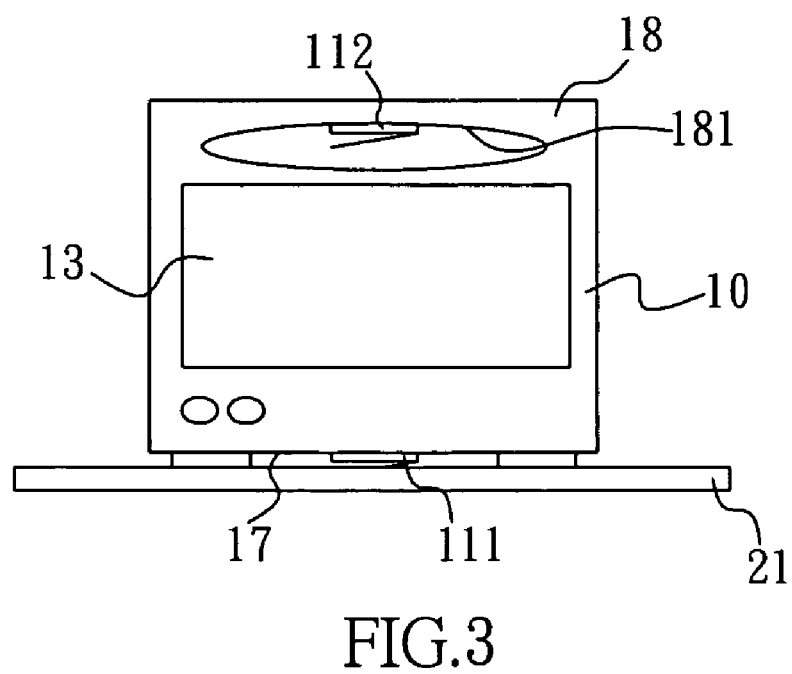
FIG. 3 is the demonstration of the second sensor mode of the first embodiment for the sensor unit in accordance with the present invention.

Referring to FIG. 2 and FIG. 3, which is respectively the demonstration of the first sensor mode and the second sensor mode of the first embodiment for the sensor unit in accordance with the present invention. According to the first embodiment, the sensor unit includes a first touch-sensor switch 111 and/or a second touch-sensor switch 112. The first touch-sensor switch 111 is installed at the bottom 17 of a portable appliance 1. The second touch-sensor switch 112 is installed at bottom 181 of a handle 18 of the portable appliance 1. When the portable appliance 1 is raised up from a shield element 21 such as a table as shown in FIG. 2, the first touch-sensor switch 111 presents a first sensor mode. When the portable appliance is disposed on the shield element 21 as shown in FIG. 3, the first touch-sensor switch presents a second sensor mode. In addition, when user intends to raise up the portable appliance by holding the second touch-sensor switch 112 installed at the bottom 181 of the handle 18 of the portable appliance 1, the second touch-sensor switch 112 presents a first sensor mode. When the portable appliance 1 is not raised up by the user resulting that the second touch-sensor switch 112 is not pressed, the second sensor mode is presented.

Figure 4:
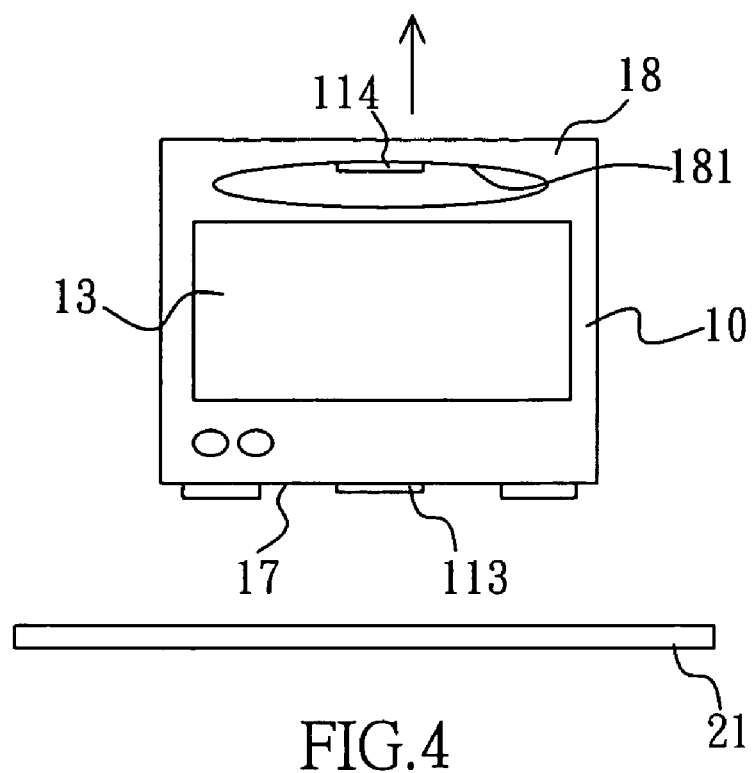
FIG. 4 is the demonstration of the first sensor mode of the second embodiment for the sensor unit in accordance with the present invention.
Figure 5:
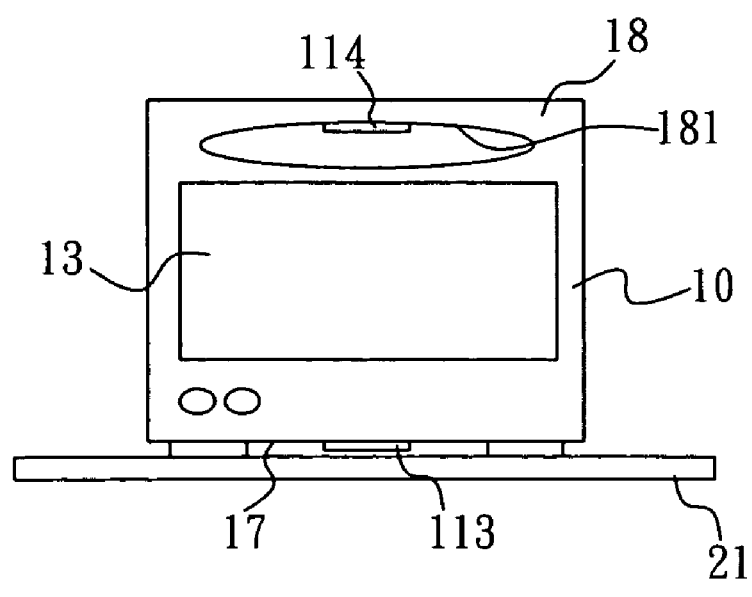
FIG. 5 is the demonstration of the second sensor mode of the second embodiment for the sensor unit in accordance with the present invention.

Referring to the FIG. 4 and FIG. 5, which is respectively the demonstration of the first sensor mode and the second sensor mode of the second embodiment for the sensor unit in accordance with the present invention. According to the second embodiment, the sensor unit includes a first optical module 113 and a second optical module 114 which are used to replace the first touch-sensor switch 111 and the second touch-sensor switch 112 shown in FIG. 2 and FIG. 3. For example, the distance between the first optical module 113 and the shielding element 21, such as a table, is set for the explanation of the second embodiment. When the portable appliance is raised up from the shield element 21 as shown in FIG. 4, the first optical module 113 presents a first sensor mode resulting from the fact that the distance between the first optical module 113 and the shielding element 21 is over a predetermined range. Whereas, when the portable appliance is disposed on the shield element 21 as shown in FIG. 5, the first optical module 113 presents a second sensor mode resulting from the fact that the distance between the first optical module 113 and the shielding element 21 is within the predetermined range. On the other hand, for example, the distance between the second optical module 114 and a shielding element 21, such as a user's hand, is set for the explanation of the second embodiment. When the portable appliance 1 is raised up, the second optical module 114 presents a first sensor mode resulting from the fact that the distance between the second optical module 114 and the shield element 21 is within the predetermined range shown in FIG. 4. Whereas, when the portable appliance is disposed on the shield element 21, the second optical module 114 presents a second sensor mode resulting from the fact that the shielding element 21 is not sensed by the second optical module 114.

Figure 6:
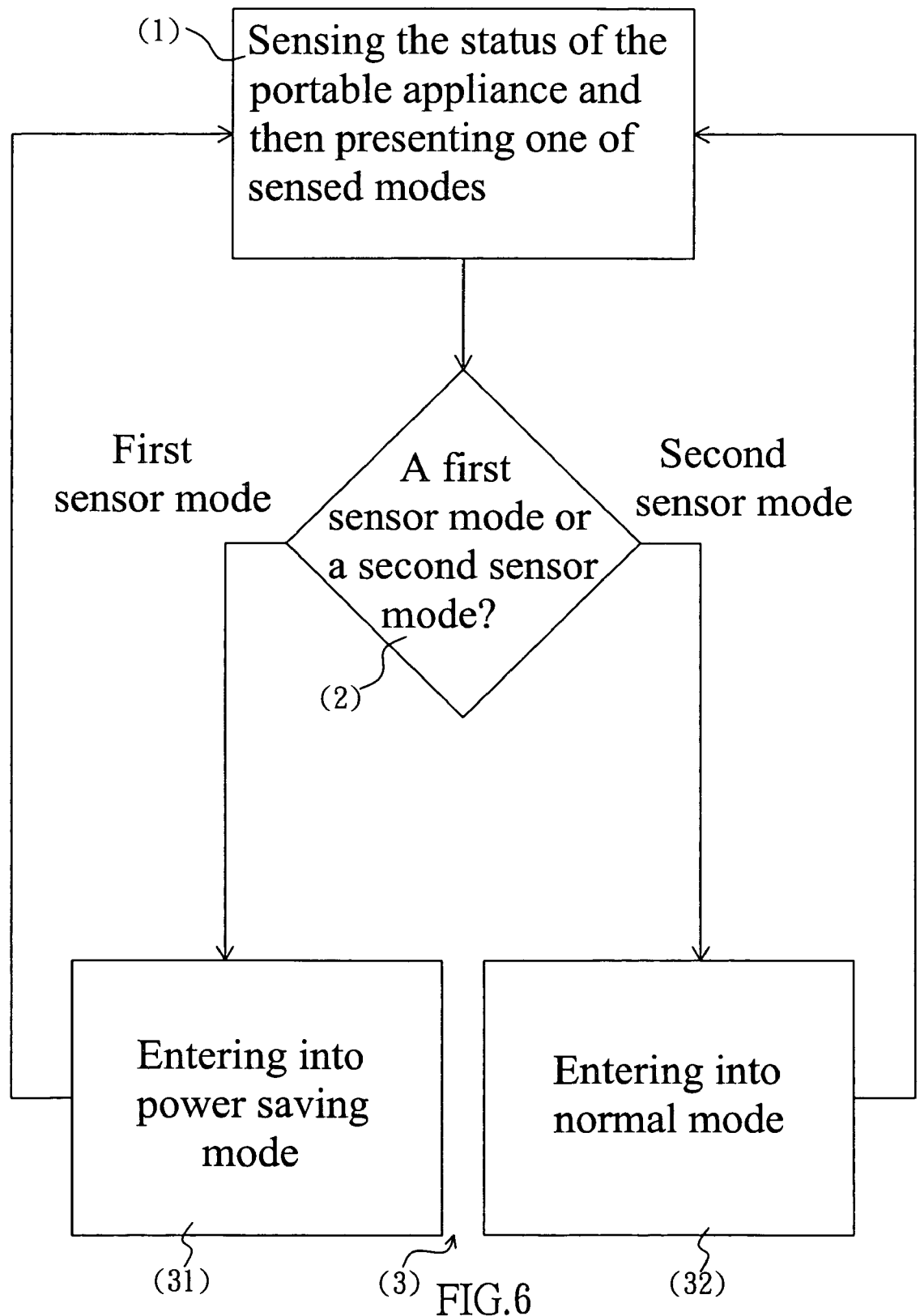
FIG. 6 is a flowchart of power saving method in accordance with the present invention.

Referring to the FIG. 1 and FIG. 6, which is respectively the functional block demonstration of the power saving apparatus and the flowchart of the power saving method in accordance with the present invention. The present invention relating to the power saving method for a portable appliance 1 having a handle and a power saving apparatus 10 with sensing function and controlling function for implementing the power saving method, comprising the steps:

Step (1): sensing the status of the portable appliance 1 by sensor unit 11 of the power saving apparatus 10 automatically whether the portable is disposed on a shield element or is raised up from the shield element. When the portable appliance 1 is raised up, the sensor unit 11 presents a first sensor mode; whereas, when the portable appliance 1 is disposed on the shield element, the sensor unit 11 presents a second sensor mode;

Step (2): continuously sensing the sensor unit 11 by the control unit 12 of the power saving apparatus 10, and then the control unit outputs a control signal corresponding to the alternative of presenting sensor modes; and Step (3): after the step (2), the interpretation of step (3) is divided into two steps, step (31) and step (32).

Step (31): when the sensor unit 11 presents a first sensor mode, the control unit 12 outputs a first control signal to command the portable appliance 1 to be in a power saving mode; or Step (32): when the sensor unit 11 presents a second sensor mode, the control unit 12 outputs a second control signal to command the portable appliance 1 to be in a normal mode.

The present invention relates to the power saving apparatus and method for the portable appliance. When the portable appliance is raised up, it is automatically commanded to enter into power saving mode which prevents the damages of electronic elements and the damage of the data caused by the vibration from moving the portable appliance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power saving apparatus for a portable appliance comprising:
    a sensor unit installed at the bottom of the portable appliance to present a first sensor mode when the sensor unit senses that the portable appliance is raised up from a shield element and a second sensor mode when the sensor unit senses that the portable appliance is disposed on the shield element; and
    a control unit electrically connecting to the sensor unit, detecting the sensor modes, and outputting a control signal corresponding to the sensor modes respectively;
    wherein, when the sensor unit presents the first sensor mode, the control unit outputs a first control signal to command the portable appliance to perform a power saving mode; when the sensor unit presents the second sensor mode, the control unit outputs a second control signal to command the portable appliance to perform a normal mode.

2. The power saving apparatus for a portable appliance of claim 1, wherein the sensor unit is a touch-sensor switch; when the portable appliance is raised up, the touch-sensor switch is inactive, and the first sensor mode is presented; when the portable appliance is disposed on the shield element, the touch-sensor switch is active, and the second sensor mode is presented.

3. The power saving apparatus for a portable appliance of claim 1 wherein the portable appliance includes a handle.

4. The power saving apparatus for a portable appliance of claim 1, wherein the sensor unit is an optical module the optical module is to detect a distance between the portable appliance and the shielding element; if the distance is over a predetermined range, the optical module presents the first sensor mode; if the distance is within the predetermined range, the optical module presents the second sensor mode.

5. The power saving apparatus for a portable appliance of claim 1, wherein the portable appliance further includes a power controller; the first control signal further commands the power controller to terminate a power output.

6. The power saving apparatus for a portable appliance of claim 5, wherein the portable appliance further includes a saving unit with a hard drive disposed therein; the first control signal commands a reading head of the hard drive to stay in a parking mode, and the first control signal further commands the power controller to terminate a power output to the saving unit.

7. The power saving apparatus for a portable appliance of claim 5, wherein the portable appliance further includes a display unit; the first control signal commands the power controller to terminate a power output to the display unit.

8. The power saving apparatus for a portable appliance of claim 1, wherein the portable appliance further includes a saving unit with a hard drive disposed therein; the first control signal further commands a reading head of the hard drive to securely stay in a parking mode.

9. The power saving apparatus for a portable appliance of claim 1, wherein the portable appliance further includes a display unit; the first control signal further commands the display unit to perform a power saving mode.

10. A power saving method for a portable appliance which has a handle and a power saving apparatus with sensing and controlling functions comprising following steps:
sensing whether the portable appliance is raised up from a shield element or disposed on the shield element; and
controlling the portable appliance to perform a normal mode when the portable appliance is disposed on the shield element, and to perform a power saving mode when the portable appliance is raised up.

11. The power saving method of claim 10, wherein the power saving apparatus comprises a sensor unit installed at the bottom of the portable appliance; when the portable appliance is raised up, the sensor unit presents a first sensor mode; when the portable appliance is disposed on the shield element, the sensor unit presents a second sensor mode.

12. The power saving method of claim 11, wherein the power saving apparatus further comprises a control unit; when the sensor unit presents the first sensor mode, the control unit outputs a first control signal to command the portable appliance to perform a power saving mode; when the sensor presents the second sensor mode, the control unit outputs a second control signal to command the portable appliance to perform a normal mode.

13. The power saving method of claim 12, wherein the sensor unit is a touch-sensor switch; when the portable appliance is raised up, the touch-sensor switch is inactive, and the first sensor mode is presented; when the portable appliance is disposed on the shield element, the touch-sensor switch is active, and the second sensor mode is presented.

14. The power saving method of claim 12, wherein the sensor unit is an optical module; the optical module is to detect a distance between the portable appliance and the shielding element; if the distance is over a predetermined range, the optical module presents a first sensor mode; if the distance is within the predetermined range, the optical module presents a second sensor mode.

15. The power saving method of claim 12, wherein the portable appliance further includes a power controller; the first control signal further commands the power controller to terminate a power output.

16. The power saving method of claim 15, wherein the portable appliance further includes a saving unit with a hard drive disposed therein; the first control signal commands a reading head of the hard drive to stay in a parking mode, and then the first control signal further commands the power controller to terminate a power output to the saving unit.

17. The power saving method of claim 15, wherein the portable appliance further includes a display unit; the first control signal commands the power controller to terminate a power output to the display unit.

18. The power saving method of claim 12, wherein the portable appliance further includes a saving unit with a hard drive disposed therein; the first control signal further commands a reading head of the hard drive to securely stay in a parking mode.

19. The power saving method of claim 12, wherein the portable appliance further includes a display unit; the first control signal further commands the display unit to perform a power saving mode.

* * * * *